United States Patent
Becker et al.

(10) Patent No.: US 9,461,346 B2
(45) Date of Patent: Oct. 4, 2016

(54) METHOD FOR AIR COOLING OF AN ELECTRIC VEHICLE TRACTION BATTERY WITH FLOW SHIFTING

(75) Inventors: Marc Becker, Idstein (DE); Remy Fontaine, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 1468 days.

(21) Appl. No.: 12/902,873

(22) Filed: Oct. 12, 2010

(65) Prior Publication Data
US 2012/0088130 A1    Apr. 12, 2012

(51) Int. Cl.
*H01M 10/6561* (2014.01)
*H01M 10/651* (2014.01)
*H01M 10/625* (2014.01)

(52) U.S. Cl.
CPC ....... *H01M 10/6561* (2015.04); *H01M 10/625* (2015.04); *H01M 2220/20* (2013.01)

(58) Field of Classification Search
CPC ......... H01M 10/6561; H01M 10/625; H01M 2220/20
USPC ................................... 429/71, 120
See application file for complete search history.

(56) References Cited

U.S. PATENT DOCUMENTS

| | | | |
|---|---|---|---|
| 4,582,765 A * | 4/1986 | Kothmann | 429/436 |
| 5,141,826 A * | 8/1992 | Bohm et al. | 429/120 |
| 7,172,831 B2 * | 2/2007 | Jaura et al. | 429/72 |
| 2009/0317697 A1 | 12/2009 | Dogariu | |
| 2009/0325051 A1 | 12/2009 | Niedzwiecki et al. | |
| 2009/0325052 A1 | 12/2009 | Koetting et al. | |
| 2012/0189893 A1 | 7/2012 | Lachenmeier | |

FOREIGN PATENT DOCUMENTS

DE    20 2010 002 352 U1    7/2010

\* cited by examiner

*Primary Examiner* — Ula C Ruddock
*Assistant Examiner* — Thomas Parsons
(74) *Attorney, Agent, or Firm* — John A. Miller; Miller IP Group, PLC

(57) ABSTRACT

A thermal management system that provides air cooling and heating for a battery by flow-shifting air through a battery enclosure. The battery includes a plurality of battery cells provided in the enclosure. The enclosure includes a first manifold having a first end and second end and second manifold opposite to the first manifold having a first end and second end. The thermal management system includes a plurality of valves for allowing air flow into and out of the first end or the second end of the first manifold and a second valve for allowing air flow into and out of the first end or the second end of the second manifold to provide the flow-shifting.

17 Claims, 5 Drawing Sheets

METHOD FOR AIR COOLING OF AN ELECTRIC VEHICLE TRACTION BATTERY WITH FLOW SHIFTING

BACKGROUND OF THE INVENTION

1. Field of the Invention

This invention relates generally to a system and method that provides air cooling for a battery and, more particularly, to a system and method that provides air cooling for an electric vehicle battery that employs flow-shifting.

2. Discussion of the Related Art

Electric vehicles are becoming more and more prevalent. These vehicles include hybrid vehicles, such as the extended range electric vehicles (EREV) that combine a battery and a main power source, such as an internal combustion engine, fuel cell systems, etc., and electric only vehicles, such as the battery electric vehicles (BEV). All of these types of electric vehicles employ a high voltage battery that includes a number of battery cells. These batteries can be different battery types, such as lithium-ion, nickel metal hydride, lead-acid, etc. A typical high voltage battery system for an electric vehicle may include a large number of battery cells or modules including several battery cells to meet the vehicle power and energy requirements. The battery system can include individual battery modules where each battery module may include a certain number of battery cells, such as twelve cells. The individual battery cells may be electrically coupled in series, or a series of cells may be electrically coupled in parallel, where a number of cells in the module are connected in series and each module is electrically coupled to the other modules in series. Different vehicle designs include different battery designs that employ various trade-offs and advantages for a particular application.

The high voltage battery on an electric vehicle is typically mounted to a steel support plate and covered with a suitable protective cover that provides a number of functions. For example, the cover is a protective cover in that it prevents the battery cells from being damaged as a result of collision with other objects. Further, the cover provides electrical insulation from the high voltage of the battery to protect individuals and users. Also, the cover provides an EMI/RFI shield that absorbs radiation over a broad range of wavelengths from the high voltage battery caused by turning on and off various current flows, which otherwise could interfere with the vehicle radio, cell phone operation, etc.

Known battery systems for electric vehicles typically include a thermal management system that maintains the battery at a desirable operating temperature to increase the performance of the battery. The thermal management system typically includes a cooling fluid line and an associated heat exchanger within the battery enclosure, where the cooling fluid line directs a cooling fluid into the enclosure and to the heat exchanger to either heat the battery when it is at low temperature or cool the battery when it is at high temperature. The thermal management system also includes a reservoir that identifies the fluid level within the coolant management system.

It is know in the art to provide cooling and heating of a vehicle battery using air by providing a blower that blows heated or cooled air through the battery enclosure. Air cooling and heating provides a number of advantages over liquid cooling and heating including lower cost, lower complexity, higher reliability, etc. For example, it is not necessary to be concerned with fluid leakage in an air thermal management system. However, as the size of the battery increases, and thus, the heat load of the battery increases, the ability to use an air thermal management system is reduced. Particularly, the higher air flow required at higher heat loads may not provide the desired maximum difference in temperature (delta T) between cells in the battery pack and within each cell itself. In other words, battery durability and performance is increased for those battery packs that have a smaller difference in temperature from one cell to other cells and a smaller difference in temperature within a cell itself. By using air heating or cooling, the temperature of the cells at one end of the battery pack may have a significantly different temperature than those cells at an opposite end of the battery pack.

It is possible to overcome these problems in temperature differentials by providing a larger flow rate of air and/or a larger volume of air. However, increases in air flow rate and volume typically require larger fans and fan speeds, which requires greater power and causes more fan noise. Thus, for electric only vehicles that typically include larger batteries, air cooling and heating has typically heretofore not been viable. However, for the reasons given above, an air cooling and heating system that provides the proper cell delta T could still be desirable.

SUMMARY OF THE INVENTION

In accordance with the teachings of the present invention, a thermal management system is disclosed that provides air cooling and heating for a battery by flow-shifting air through a battery enclosure. The battery includes a plurality of battery cells provided in the enclosure. The enclosure includes a first manifold having a first end and second end and second manifold opposite to the first manifold having a first end and second end. The thermal management system includes a plurality of valves for allowing air flow into and out of the first end or the second end of the first manifold and a second valve for allowing air flow into and out of the first end or the second end of the second manifold to provide the flow-shifting.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for providing air flow-shifting for heating and cooling a battery pack is merely exemplary in nature, and is in no way intended to limit the invention or its applications or uses. For example, the present invention provides air heating and cooling of a vehicle battery. However, as well be appreciated by those skilled in the art, the air heating and cooling can be for batteries for other applications.

As will be discussed in detail below, the present invention proposes a battery thermal management system that provides air flow-shifting through a battery enclosure including a plurality of battery cells. In one non-limiting embodiment, the thermal management system is for cooling and heating a vehicle battery, for example, a lithium-ion battery, a metal hydride battery, a lead-acid battery, etc. However, as will be appreciated by those skilled in the art, the thermal management system of the invention may have application for other battery systems and battery types.

Figure 1:
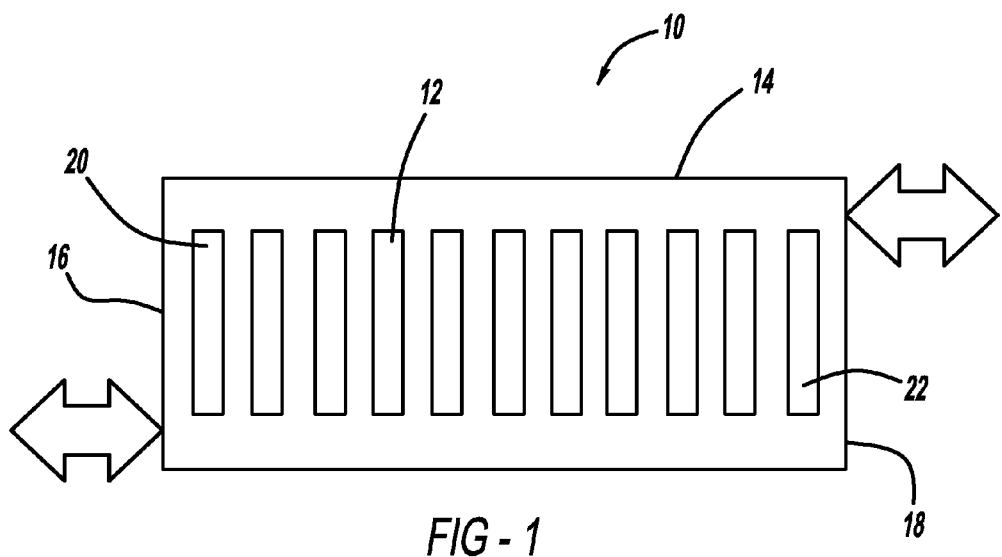
FIG. 1 is a plan view of a battery pack including battery cells.

FIG. 1 is a general representation of a battery pack 10 or module including a plurality of parallel oriented battery cells 12 positioned within an enclosure 14. The battery pack 10 is intended to represent a high voltage battery, such as a high voltage vehicle battery, and may be one module of several modules that make up the complete battery. Flow-shifting is provided by flowing heating or cooling air into the enclosure 40 from a first end 16 and out a second end 18, and then reversing the flow so that the air enters the second end 18 of the enclosure 14 and flows out of the first end 16, as represented by the arrows. When the heating or cooling air enters the first end 16, a first cell 20 receives the air flow, and the air flows towards the second end and in a parallel direction between the cells 12, where a last cell 22 receives the air. Likewise, when the air flow is from the second end 18 to the first end 16, the cell 22 is the first to receive the air and the cell 20 is the last to receive the air. For the discussion below, one common end of all of the cells 12 represents one side of the enclosure 14 and the other common end of all of the cells 12 represents an opposite side of the enclosure 14, where the air flow enters or exits one side of the enclosure 14 at one end and enters and exits the enclosure 14 at the opposite side at the other end, as shown.

Figure 2:
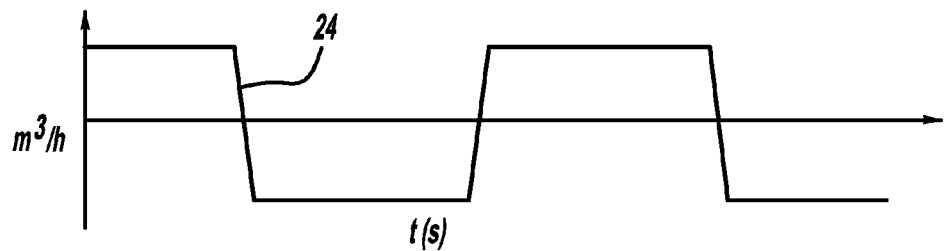
FIG. 2 is a graph with time on the horizontal axis and flow rate on the vertical axis showing timing for providing air flow-shifting for battery thermal management.

FIG. 2 is a graph with time in seconds on the horizontal axis and air volume flow rate in meters cubed per hour ($m^3/h$) on the vertical axis showing the volume flow of air through the enclosure 14. Graph line 24 shows the direction of air flow through the enclosure 14 where the flow shifts at a certain frequency to provide the flow-shifting described herein. The particular design for a particular system would consider the delta T through a particular cell 12 and from one cell 12 to the next cell 12 to determine the volume flow rate and frequency of the flow-shifting to provide a minimal amount of volume flow to provide a reduced fan speed, and thus fan noise, and low power consumption.

The following discussion shows the benefits of providing flow-shifting for battery cell thermal management to maintain a desired delta T across a particular cell and a desired delta T from one cell to another cell for both cell heating and cooling applications.

Figure 3:
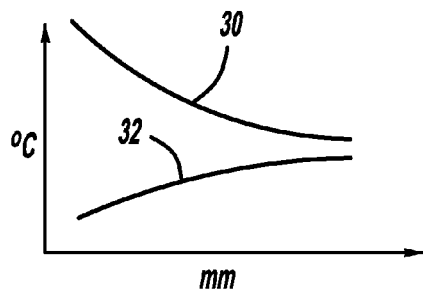
FIG. 3 is a graph with cell position on the horizontal axis and temperature on the vertical axis showing a relationship between cell temperature and air temperature for cell heating with air flow in one direction.

FIG. 3 is a graph with cell position, i.e., the physical position along the cell, on the horizontal axis for one of the cells 12 and temperature on the vertical axis showing variations in cell temperature for cell heating without flow-shifting. In this example, air flows along the cell 12 from a left side of the cell 12 to a right side of the cell 12, as represented by the horizontal axis. Graph line 30 represents the temperature of the air as it flows along the cell 12, where the temperature of the air is reduced as a result of the heat exchange with the cell 12. Graph line 32 shows that the temperature of the cell 12 increases depending on its position along the cell 12 relative to the air flow. This change in temperature from one position in the cell 12 to another position in the cell 12 represents the cell delta T, and if that value is too high, then the cell 12 has an undesirable loss of efficiency and performance, as discussed above.

Figure 4:
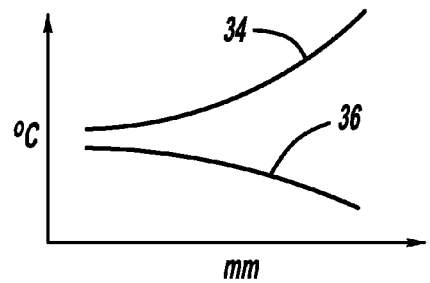
FIG. 4 is a graph with cell position on the horizontal axis and temperature on the vertical axis showing a relationship between cell temperature and air temperature for cell heating with air flow in an opposite direction.

FIG. 4 is the graph shown in FIG. 3 for cell heating, with the air flow from a right to left direction, which shows the opposite delta T of the cell temperature by graph line 36, where graph line 34 is the air temperature.

Figure 5:
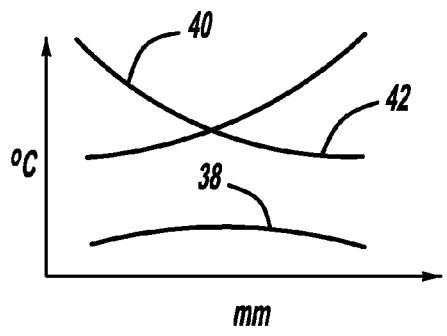
FIG. 5 is a graph with cell position on the horizontal axis and temperature on the vertical axis showing a relationship between cell temperature and air temperature for cell heating with air flow-shifting.

FIG. 5 is the graph shown in FIG. 3 for cell heating, with flow-shifting, which shows cell temperature by graph line 38. Graph lines 40 and 42 represent the graph lines 30 and 34, respectively. As is apparent, the air flow-shifting along the particular cell 12 causes the temperature of the cell 12 to be more consistent, as compared to the graph lines 32 and 36 with no flow-shifting, thus providing a reduced cell delta T.

Figure 6:
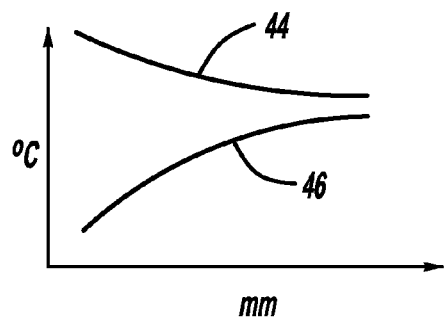
FIG. 6 is a graph with cell position on the horizontal axis and temperature on the vertical axis showing a relationship between cell temperature and air temperature for cell cooling with air flow in one direction.

FIG. 6 is the graph shown in FIG. 3 for cell cooling where the temperature of the cooling air increases as it flows along the cell 12 and where the air flow direction is from left to right. Graph line 44 represents the temperature of the cell 12 from one end of the cell 12 to the other end of the cell 12 and graph line 46 represents the temperature of the air from one end of the cell 12 to the other end of the cell 12.

Figure 7:
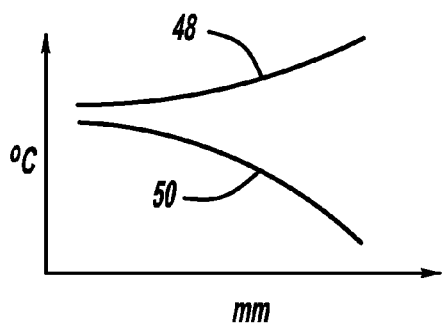
FIG. 7 is a graph with cell position on the horizontal axis and temperature on the vertical axis showing a relationship between cell temperature and air temperature for cell cooling with air flow in an opposite direction.

FIG. 7 is the graph shown in FIG. 3 for cell cooling where the flow of cooling air is from the right to the left, and where graph line 48 represents the temperature of the cell 12 and graph line 50 represents the temperature of the air.

Figure 8:
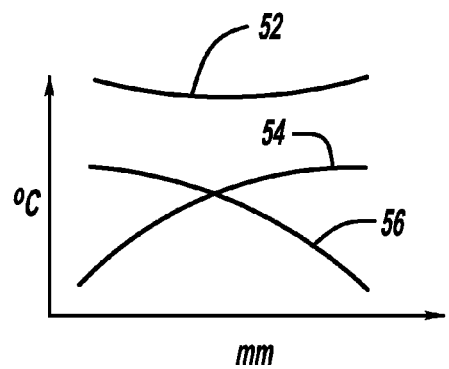
FIG. 8 is a graph with cell position on the horizontal axis and temperature on the vertical axis showing a relationship between cell temperature and air temperature with air flow-shifting.

FIG. 8 is the graph shown in FIG. 3 for cell cooling with flow-shifting. Graph line 52 is the temperature of the cell 12 as a result of the flow-shifting and graph lines 54 and 56 represent the graph lines 46 and 50, respectively. As above, the flow-shifting provides a reduced cell delta T as compared to the graph lines 46 and 50.

Figure 9:
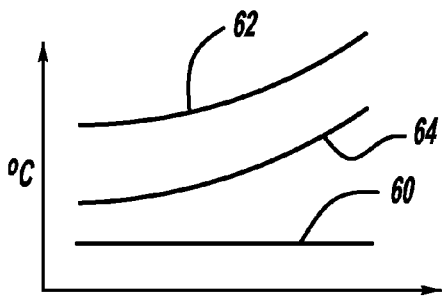
FIG. 9 is a graph with cell number on the horizontal axis and temperature on the vertical axis showing a relationship between cell temperature at an inlet end and an outlet end of a battery pack for cell heating with air flow in one direction.

FIG. 9 is a graph with cell number on the horizontal axis and temperature on the vertical axis for cell heating showing the relationship between the temperature of a cell depending on its position in the line of cells relative to ambient temperature. Graph line 60 represents the ambient temperature in this example and the air flow is from right to left, where the first cell 12 to receive the air flow is at a right end of the enclosure 14. Graph line 62 shows the temperature of the air at one side of the enclosure 14 at an air inlet end of the cells 12 and graph line 64 shows the temperature of the air at an opposite side of the enclosure 14 at an air outlet end of the cells 12. The graph lines 62 and 64 show that the temperature of the air at the inlet side is greater than the temperature of the air at the outlet side, and the temperature of the cells 12 at the inlet side is higher than the temperature of the cells 12 at the outlet side.

Figure 10:
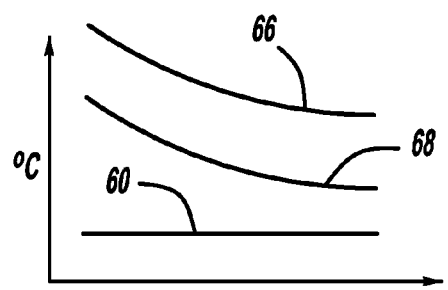
FIG. 10 is a graph with cell number on the horizontal axis and temperature on the vertical axis showing a relationship between air temperature at an inlet end and an outlet end of a battery pack for cell heating with air flow in an opposite direction.

FIG. 10 is the graph shown in FIG. 9 for cell heating where the air flow is from left to right through the enclosure 14. Graph line 66 shows the temperature of the air at one side of the enclosure 14 at an air inlet end of the cells 12 and graph line 68 shows the temperature of the air at an opposite side of the enclosure 14 at an air outlet end of the cells 12, also showing that the temperature of the air at the inlet side is greater than the temperature of the air at the outlet side, and the temperature of cells 12 at the inlet side is higher than the temperature of the cells 12 at the outlet side.

Figure 11:
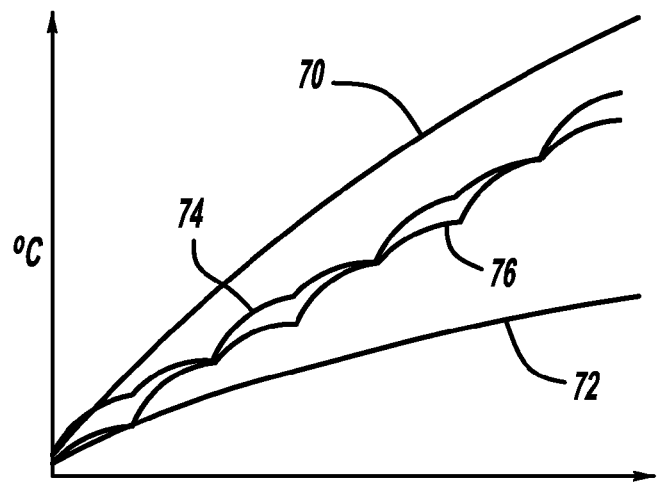
FIG. 11 is a graph with time on the horizontal axis and cell temperature on the vertical axis showing relative cell temperatures for air flow without flow-shifting and air flow with flow-shifting.

FIG. 11 is a graph with time on the horizontal axis and cell temperature on the vertical axis showing the relationship for cell heating between the temperature of the first cell 12 to receive the air flow and the last cell 12 to receive the air flow for both no flow-shifting and flow-shifting. Particularly, graph line 70 represents the temperature of the first cell 12 and graph line 72 represents the temperature of the last cell 12 in the direction of the flow of air with no flow-shifting. As time increases, the difference between the temperature of these two cells increases. Graph line 74 represents the temperature of the first cell 12 that receives the air flow and graph line 76 represents the temperature of the last cell 12 to receive the air flow during flow-shifting, where the temperature of the two cells stays about the same over time.

Figure 12:
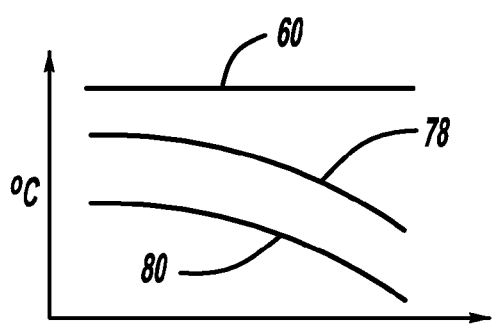
FIG. 12 is a graph with cell position on the horizontal axis and temperature on the vertical axis showing a relationship between air temperature at an inlet end and an outlet end of a battery pack for cell cooling with air flow in one direction.

FIG. 12 is the graph shown in FIG. 9 for cell cooling with the air flow from right to left through the enclosure 14. Graph line 78 shows the temperature of the air at the inlet side of the cells 12 and graph line 80 shows the temperature of the air at the outlet side of the cells 12.

Figure 13:
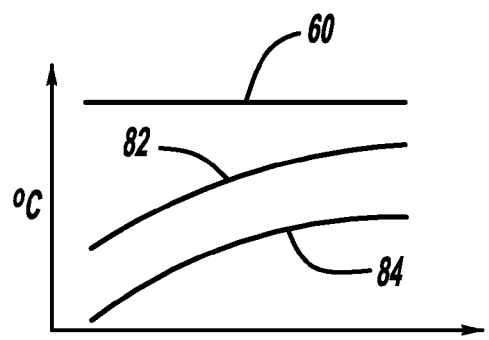
FIG. 13 is a graph with cell number on the horizontal axis and temperature on the vertical axis showing a relationship between air temperature at an inlet end and an outlet end of a battery pack for cell cooling with air flow in an opposite direction.

FIG. 13 is the graph shown in FIG. 9 for cell cooling where the flow of air is from the left side to the right side through the enclosure 14. Graph line 82 is the temperature of the air at the inlet side of the cells 12 and graph line 84 is the temperature of the air at the outlet side of the cells 12.

Figure 14:
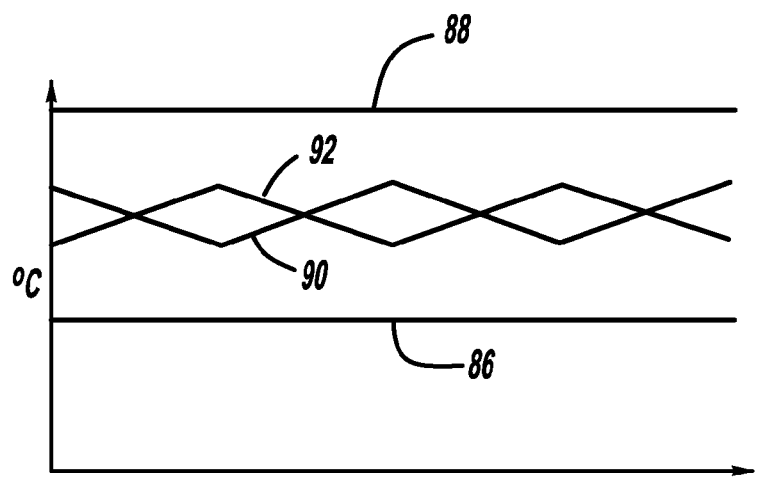
FIG. 14 is a graph with time on the horizontal axis and cell temperature on the vertical axis showing a relationship between cell temperature at an inlet end and an outlet end of a battery pack for air flow without flow-shifting and air flow with flow-shifting.

FIG. 14 is a graph with time on the horizontal axis and cell temperature on the vertical axis showing the relative cell temperatures for cell cooling for both no flow-shifting and flow-shifting. Graph line 86 is the temperature of the first cell 12 that receives the cooling air flow over time and graph line 88 is the temperature of the last cell 12 that receives the cooling air over time. Because the air flow heats up as it flows across the cells 12, the difference between the temperature of the first cell 12 and the last cell 12 is significant. Graph line 90 represents the temperature of one end cell in the enclosure 14 and graph line 92 is the temperature of the other end cell in the enclosure 14 for cell cooling with air flow-shifting. As is apparent, the temperature of the two end cells remains substantially constant overtime.

Figure 15:
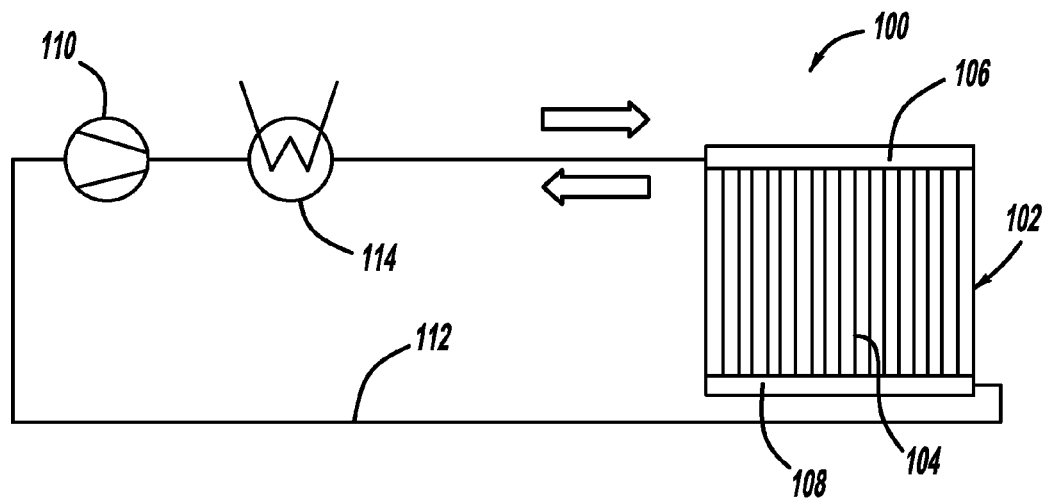
FIG. 15 is a schematic plan view of a system including a battery pack and an axial blower providing air flow in two directions to provide flow-shifting.

The present invention contemplates any structural configuration or design to provide the air flow-shifting through a battery enclosure including multiple cells. FIG. 15 is a schematic plan view of a thermal management system 100 including a battery pack 102 having a plurality of battery cells 104. The battery pack 102 includes a first air flow manifold 106 at one end of the cells 104 and a second air flow manifold 108 at an opposite end of the cells 104. A blower 110, such as an axial blower, provides an air flow through line 112, such as a hose, outside of the battery pack 102 that flows through the battery pack 102 from the manifold 106 to the manifold 108 or from the manifold 108 to the manifold 106. A suitable heat exchanger 114 is provided in the system 100 through which the air from the blower 110 flows to either heat the air to increase the temperature of the cells 104 during cold operation or cool the air flowing through the cells 104 during hot operation. The blower 110 is controlled so that it reverses its direction at the desired frequency and the desired speed to provide the flow-shifting consistent with the discussion above.

Figure 16:
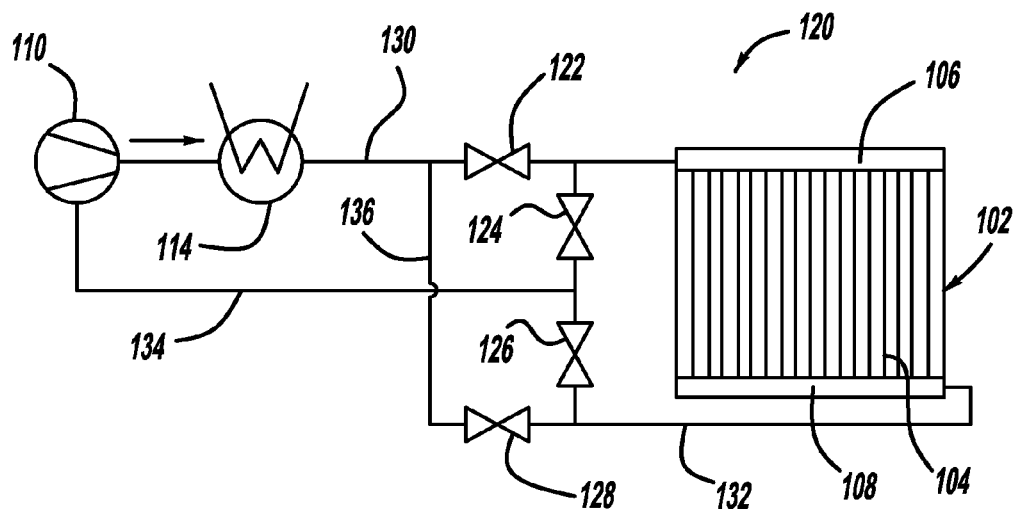
FIG. 16 is a schematic plan view of a system including a battery pack and valves that provide air flow-shifting.

FIG. 16 is a schematic plan view of a thermal management system 120, where like elements to the system 100 are identified by the same reference numeral. In this embodiment, the direction of flow of air from the blower 110 is not reversed, where the direction of the air flow is always in the direction shown by the arrow. In order to provide the flow-shifting, valves 122, 124, 126 and 128 are provided. In this design, the air enters the manifold 106 at one end and side of the battery pack 102 and exits the manifold 108 at an opposite end and side of the manifold 108. When the flow is in the direction where the air enters the manifold 106 and exits the manifold 108, valves 122 and 126 are opened and valves 124 and 128 are closed. In this configuration, the air flows into the manifold 106 from line 130, out of the manifold 108 through line 132 and back through the blower 110 through line 134. When the flow is reversed, the valves 122 and 126 are closed and the valves 124 and 128 are opened so that the air flows into the manifold 108 through the lines 136 and 132 and out of the manifold 106 through the line 130. In an alternate configuration, the valves 122 and 124 can be provided as a single three-way valve and the valves 126 and 128 can be provided as a single three-way valve, as would be well understood by those skilled in the art.

Figure 17:
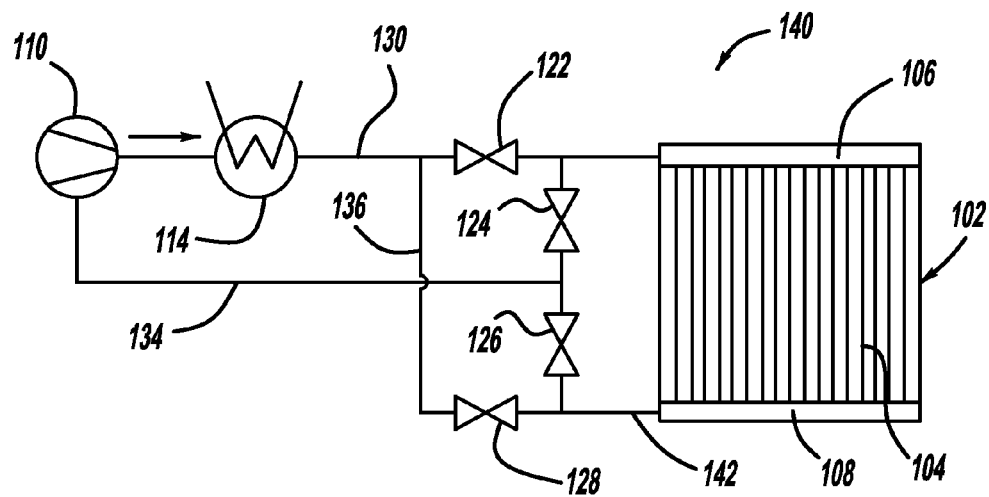
FIG. 17 is a schematic plan view of another system including a battery pack and valves that provide air flow-shifting.

As discussed above, the system 120 provides air flow entering the battery pack 102 at one end and side and exiting the battery pack 102 at an opposite end and side. In an alternate embodiment that may provide advantages for packaging, the air flow can flow into the manifold 106 or 108 at one end and exit the other manifold 106 or 108 at the same end. This is shown by the thermal management system 140 in FIG. 17 where like elements to the system 120 are identified by the same reference numeral. In this embodiment, the line 132 is replaced by line 142 so that the air flow enters and exits the battery pack 102 at the same end.

Figure 18:
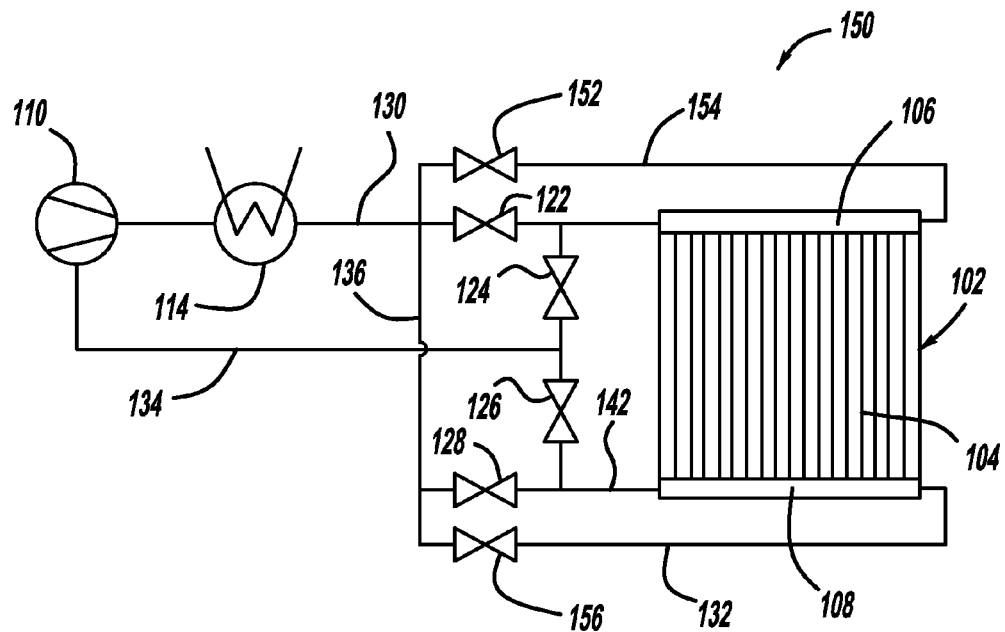
FIG. 18 is a schematic plan view of another system including air of a battery pack and valves that provide air with flow-shifting.

FIG. 18 is a schematic plan view of a thermal management system 150, where like elements to the systems 120 and 140 are identified by the same reference numeral. In this design, plumbing and valves are provided so that the air flow can enter and exit either end of the manifolds 106 and 108, which makes it a combination of the systems 120 and 140. A valve 152 is provided in line 154 that allows air flow to enter or exit at a right side of the manifold 106 and a valve 156 is provided in the line 132 that allows air flow to enter or exit the right side of the manifold 108. If the valves 152 and 126 are open and the valves 122, 124, 128 and 156 are closed, air flow can enter the manifold 106 on the line 154 and exit the manifold 108 on the line 142. If the valves 122 and 126 are open and the valves 152, 124, 128 and 156 are closed, air flow can enter the manifold 106 on the line 130 and exit the manifold 108 on the line 142. If the valves 128 and 124 are open and the valves 152, 122, 126 and 156 are closed, the air flow can enter the manifold 108 on the line 142 and exit the manifold 106 on the line 130. If the valves 124 and 156 are open and the valves 152, 122, 126 and 128 are closed, the air flow can enter the manifold 108 on the line 132 and exit the manifold 106 on the line 130.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A thermal management system for a battery, said battery including a plurality of battery cells provided in an enclosure, said enclosure including a first manifold having a first end and a second end and a second manifold opposite to the first manifold having a first end and a second end, said system comprising:
    a first three-way valve for allowing fluid flow into or out of the first end or the second end of the first manifold; and
    a second three-way valve for allowing fluid flow into or out of the first end or the second end of the second manifold so that the fluid flow through the enclosure flow shifts in a back and forth direction.

2. The system according to claim 1 further comprising a third valve that in combination with the first valve allows the fluid flow into or out of the first end of the first manifold and a fourth valve that in combination with the second valve allows the fluid flow into or out of the second end of the second manifold.

3. The system according to claim 1 further comprising a third valve that in combination with the first valve allows the fluid flow into or out of the first end of the first manifold and a fourth valve that in combination with the second valve allows the fluid flow into or out of the first end of the second manifold.

4. The system according to claim 1 wherein the first valve allows fluid flow into or out of the first end of the first manifold and the second valve allows fluid flow into or out of the second end of the second manifold.

5. The system according to claim 1 wherein the first valve allows fluid flow into or out of the first end of the first manifold and the second valve allows fluid flow into or out of the first end of the second manifold.

6. The system according to claim 1 wherein the first valve allows fluid flow into or out of the second end of the first manifold and the second valve allows fluid flow into or out of the first end of the second manifold.

7. The system according to claim 1 further comprising a heat exchanger that provides cooling and heating of the fluid.

8. The system according to claim 1 wherein the plurality of battery cells are oriented in parallel where the fluid flow flows between the cells from a first side of the enclosure at one end of the cells and flow to a second side of the enclosure at another end of the cells.

9. The system according to claim 1 wherein the fluid is air and the system further comprises a blower for providing an air flow.

10. The system according to claim 1 wherein the battery is a high voltage vehicle battery.

11. The system according to claim 1 wherein the battery is selected from the group comprising lithium-ion batteries, nickel metal hydride batteries and lead acid batteries.

12. A thermal management system for a battery, said battery including a plurality of battery cells provided in an enclosure, said enclosure including a first manifold having a first end and second end and a second manifold opposite the first manifold having a first end and a second end, said system comprising:
    a blower providing an air flow to the enclosure; and
    a plurality of valves directing the air flow from the blower through the enclosure, said valves being selectively controlled to provide air flow-shifting through the enclosure so that the air flow alternates in direction through the enclosure, where the plurality of valves is four valves.

13. The system according to claim 12 wherein the plurality of valves allow air flow into or out of the first end of the first manifold and into and out of the second end of the second manifold.

14. The system according to claim 12 wherein the plurality of valves allow air flow into or out of the first end of the first manifold and into or out of the first end of the second manifold.

15. The system according to claim 12 wherein the plurality of valves selectively allow air flow into or out of the first end of the first manifold, into or out of the second end of the first manifold, into or out of the first end of the second manifold and into or out of the second end of the second manifold.

16. The system according to claim 12 wherein the battery is a high voltage vehicle battery.

17. A thermal management system for a battery provided in a battery enclosure, said enclosure including a first manifold having a first end and second end and a second manifold opposite the first manifold having a first end and a second end, said system comprising:
    a blower providing an air flow to the enclosure; and
    a plurality of valves directing the air flow from the blower through the enclosure, said valves being selectively controlled to provide air flow-shifting through the enclosure so that the air flow alternates in direction through the enclosure, where the plurality of valves is six valves, and the valves can be configured to direct the air flow into either the first or second end of the first manifold and out of either the first or second end of the second manifold, and alternately configured to direct the air flow into either the first or second end of the second manifold and out of either the first or second end of the first manifold.

\* \* \* \* \*